Figure 1:
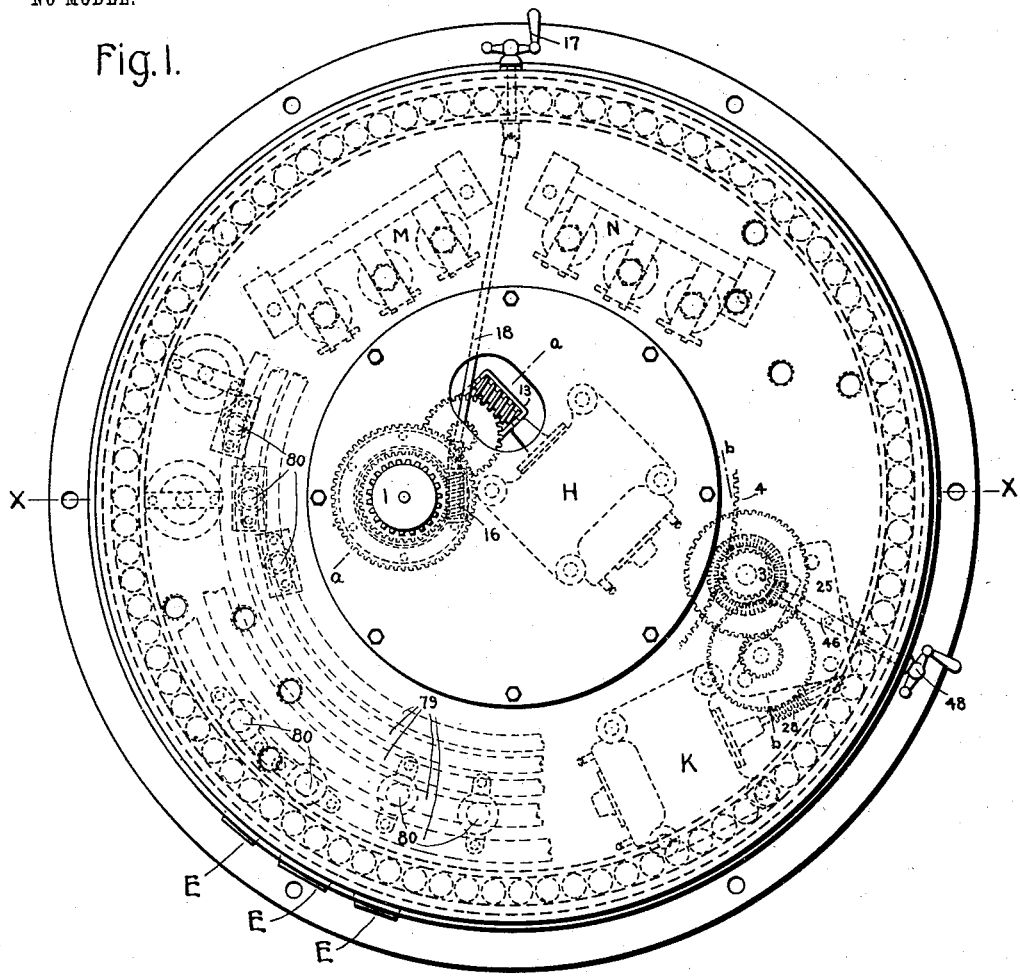

No. 739,599. PATENTED SEPT. 22, 1903.
J. L. HALL.
SEARCH LIGHT PROJECTOR.
APPLICATION FILED FEB. 24, 1903.
NO MODEL. 3 SHEETS—SHEET 1.

WITNESSES
J. Ellis Glenn.
Helen Orford.

INVENTOR
John L. Hall.
by Albert H. Davis
Atty.

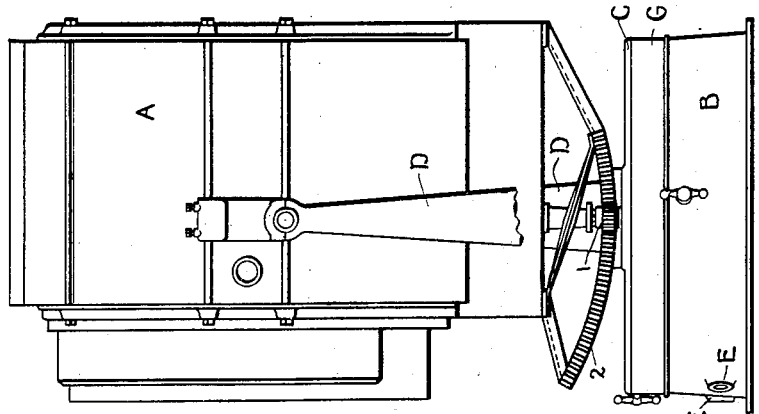
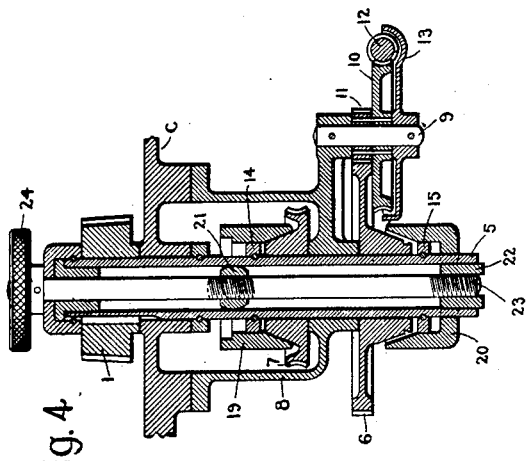
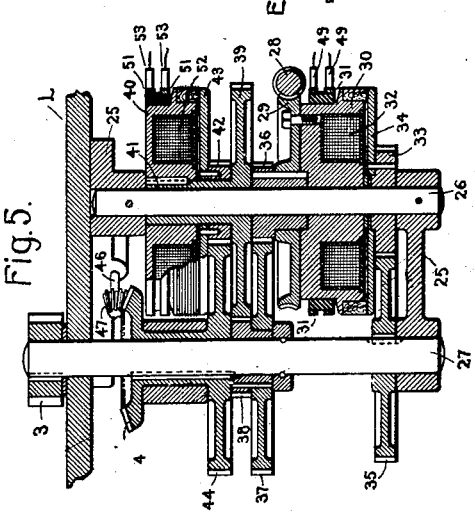
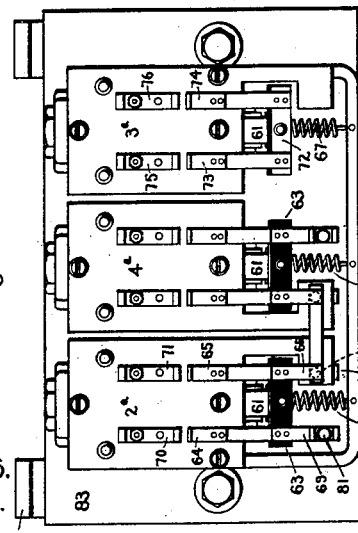
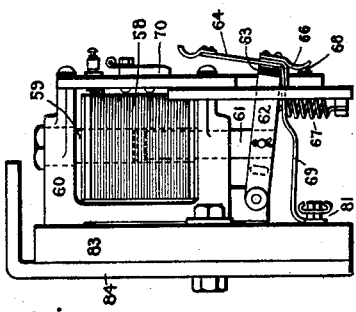

No. 739,599. PATENTED SEPT. 22, 1903.
J. L. HALL.
SEARCH LIGHT PROJECTOR.
APPLICATION FILED FEB. 24, 1903.
NO MODEL. 3 SHEETS—SHEET 3.

WITNESSES.
J. Ellis Glenn.
Helen Oxford

INVENTOR
John L. Hall.
by Allen S. Davis
Att'y.

No. 739,599. Patented September 22, 1903.

UNITED STATES PATENT OFFICE.

JOHN L. HALL, OF SCHENECTADY, NEW YORK, ASSIGNOR TO GENERAL ELECTRIC COMPANY, A CORPORATION OF NEW YORK.

SEARCH-LIGHT PROJECTOR.

SPECIFICATION forming part of Letters Patent No. 739,599, dated September 22, 1903.

Application filed February 24, 1903. Serial No. 144,642. (No model.)

*To all whom it may concern:*

Be it known that I, JOHN L. HALL, a citizen of the United States, residing at Schenectady, county of Schenectady, State of New York, have invented certain new and useful Improvements in Search-Light Projectors, of which the following is a specification.

This invention relates to search-light projectors, with special reference to the mechanism by which the beam of light is trained in altitude and azimuth. Its object is, broadly, to provide means for turning the projector in any direction and at varying speeds from a point distant therefrom and for stopping the turning motion instantly when the projector is in the desired position.

In order that a search-light may command the greatest possible territory and the beam of light be unobstructed by buildings or other objects, projectors are often placed in a position distant from the point from which the objects in the path of the beam are viewed. Obviously it is important that the direction of the beam of light be controlled from this point, and as the ordinary devices could not be used on account of the distance and the many obstructions systems of control have been devised by which electric motors located in the base of the projector and controlled from the desired point accomplish the training.

It is important that the motors be so connected that they can be run at varying speeds, so that a slight movement of the projector can be made accurately and a greater movement made quickly, and, further, that means be provided for stopping the motors immediately when the projector is in the desired position. To accomplish these ends, I provide electromagnetically-actuated switches in the base of the projector controlled by a master-controller from any desired point. These switches close the circuit through the armatures of the motors in either direction through resistance and also short-circuit the resistance. As the direction of the current through the fields of the motors remains the same, they can thus be made to rotate in either direction and at two speeds, depending on whether the resistance is or is not connected in the armature-circuit. These switches are also provided with auxiliary contacts closed when the switches are opened, and through these contacts the motor-armatures are short-circuited, stopping the motors immediately.

It has been found desirable, especially in sea-coast defense, to provide projectors with mechanism in addition to the ordinary training mechanism by which they can be rotated horizontally at a very slow speed, so that the beam of light slowly sweeps the entire horizon.

My invention consists of certain improvements in the construction and arrangement of the parts of electrically-controlled search-light projectors, which will be fully described hereinafter and definitely pointed out in the appended claims; and, further, it embraces mechanism in addition to the ordinary training mechanism by which the projector can be rotated horizontally at a greatly-reduced rate.

Figure 2:
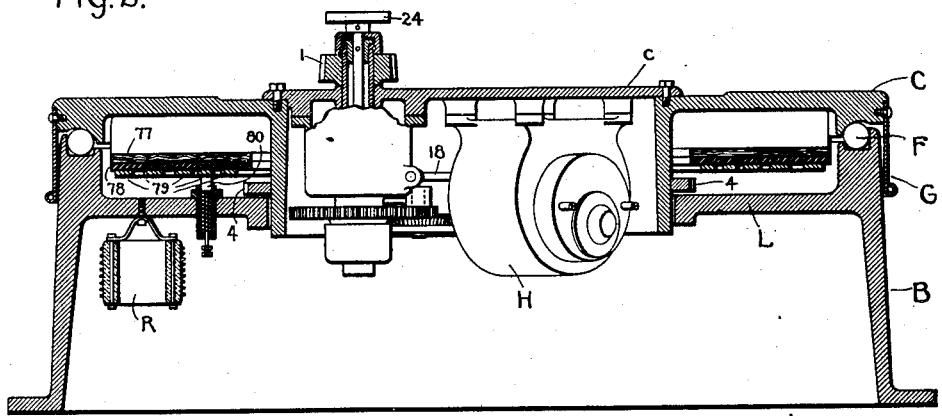
Figure 8:
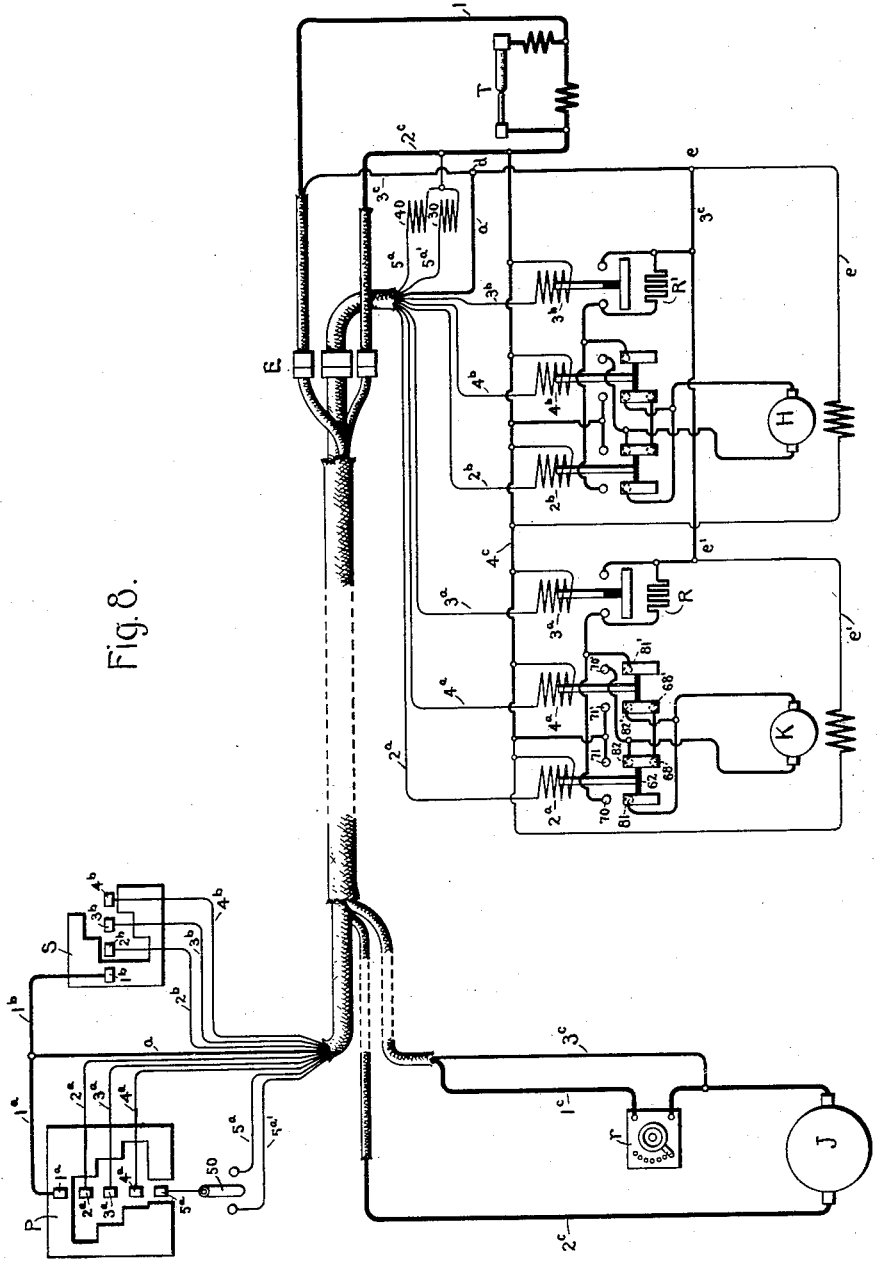

In the accompanying drawings, which show an embodiment of my invention, Figure 1 is a plan view of the projector turn-table and base. Fig. 2 is a section along the line X X of Fig. 1, showing the motor and casing for the vertical training in perspective. Fig. 3 is a side elevation of a projector having one of the arms broken away in part. Figs. 4 and 5 are sections along lines *a a* and *b b*, respectively, of Fig. 1. Figs. 6 and 7 are front and side elevations, respectively, of one of the two groups of switches; and Fig. 8 is a diagram of the circuits.

In Fig. 3, A is the projector-drum, in which is an arc-lamp of suitable construction. B represents the base of the projector, having apertures E E E, through which the wires carrying current to the motors and the arc-lamp are led in any convenient manner, as by plugs and receptacles. The base B has a groove formed in its upper edge, as shown in Fig. 2, to receive balls F, which form a bearing for the turn-table C. The central portion of the turn-table C is a plate *c*, fastened to but detachable from the main body of the turn-table. Secured to the main body of the turn-table and extending upward therefrom are arms D, having bearings formed in their upper ends, in which the projector-drum is trunnioned. Fastened to the outside of the turn-table is a shield G, extending down over the opening between the turn-table and the base to protect the bearing from dust and water.

The training is accomplished by two motors H and K, situated within the base of the projector. The motor H is suspended from the under side of plate c of the turn-table C and drives the gear-wheel 1, which meshes with the segmental gear 2, secured to the drum of the projector. The motor H, gear-wheel 1, and all the mechanism by which the motor drives the gear-wheel are supported from plate c of the turn-table C, so that when desired for inspection or other purposes the plate c and all the parts attached thereto can be taken out by simply withdrawing the screws that hold plate c in place. The motor K is suspended from a platform L, formed integral with the base and extending inwardly from its sides and drives pinion 3. This pinion meshes with a gear-wheel 4, which encircles and is secured to a cylindrical flange depending from the turn-table. After many experiments I have adopted this arrangement as the one best adapted to maintain the parts free from strains and allow easy working under all conditions.

The gear-wheel 1 is keyed to the hollow sleeve 5, on which are loosely mounted gear-wheel 6 and worm-wheel 7. Secured to the under side of plate c of the turn-table C is a frame 8, which forms a bearing for the sleeve 5 and, together with collars 14 and 15, secured to the sleeve, holds gear-wheel 6 and worm-wheel 7 in position. The frame has an extension which carries the stationary shaft 9, on which are loosely mounted worm-wheel 10 and pinion 11, rigidly fastened thereto. The motor H has a worm 12 on the end of its shaft which meshes with worm-wheel 10, and thus drives gear-wheel 6 by the pinion 11, fastened to the worm-wheel and meshing with gear-wheel 6. On the lower end of shaft 9 is a tray 13, which holds worm-wheel 10 in place and forms an oil-tray for the worm and worm-wheel. In mesh with the worm-wheel 7 is a worm 16, Fig. 1, on a shaft 18, extending through the frame 8 and the side of the turn-table C and having a hand-wheel 17 on its outer end. The shaft 18 has two universal joints therein, as the worm-wheel is lower than the sides of the turn-table. Mounted on the sleeve 5, Fig. 4, are two cup-shaped clutches 19 and 20, registering with conical surfaces on worm-wheel 7 and gear-wheel 6, respectively, each clutch having a cross-piece 21 and 22, respectively, extending through a longitudinal slot cut in sleeve 5, the slot for cross-piece 21 being at about the middle of the length of the sleeve and that for cross-piece 22 being at its lower end. The cross-pieces 21 and 22 are each provided with a central threaded bore into which is screwed a threaded rod 23, carrying a hand-nut 24 at its upper end above the turn-table C and gear-wheel 1. The clutches 19 and 20 are so adjusted on rod 23 that one is free from contact with the wheel which drives it, while the other is in clutch, and as the threads are the same in both cross-pieces both clutches are raised and lowered together.

The operation of the vertical training mechanism is as follows: The hand-nut 24 is turned in a direction to raise the clutches. Clutch 14 is thrown out of contact with worm-wheel 7 and clutch 20 into contact with gear-wheel 6. When the motor is started, the training is accomplished through worm 12, worm-wheel 10, pinion 11, wheel 6, clutch 20, cross-piece 22, turning sleeve 5 by pressing against the sides of the slot, and gear-wheel 1, keyed to sleeve 5. By turning hand-nut 24 in the opposite direction the clutches are both lowered to the position shown in Fig. 4 and the projector can be trained in altitude by hand from the hand-wheel 17 by means of shaft 18, worm 16, worm-wheel 7, clutch 19, cross-piece 21, sleeve 5, and gear-wheel 1.

Secured to the under side of platform L of the base is a frame 25, carrying the stationary shaft 26. The frame 25 is also formed with bearings for the shaft 27, which extends upward through the platform L and carries at its upper end the pinion 3 in mesh with gear-wheel 4. The motor K has a worm 28 on the end of its shaft meshing with worm-wheel 29, which is loosely mounted on stationary shaft 26. To the worm-wheel is rigidly secured the magnetic friction-clutch 30, having collector-rings 31 31 thereon and a magnetizing-coil 32, sunk in a circular groove. Current is led to the coil 32 by brushes 49 49, mounted on the side wall of the projector-base and bearing on collector-rings 31 31. Below the clutch on shaft 26 is a pinion 33, to which is rigidly fastened armature 34 of the magnetic clutch. Pinion 33 meshes with gear-wheel 35, which is keyed to shaft 27. Above worm-wheel 29 and secured thereto is a pinion 36, meshing with gear-wheel 37, which is loose on shaft 27 and to which is secured a pinion 38, meshing with gear-wheel 39, loose on shaft 26. Gear-wheel 39 has a collar 41 formed on its upper side extending upward around shaft 26, and at the upper end of this collar is rigidly secured a second magnetic friction-clutch 40, having collector-rings 51 51, magnetizing-coil 52, and brushes 53 53, similar to clutch 30. Loosely mounted on collar 41 below clutch 40 is a pinion 42, to which is pinned armature 43 of the clutch. Pinion 42 meshes with gear-wheel 44, keyed to the shaft 27, and extending upward from wheel 44 is a collar carrying at its upper end bevel-gear 45. Extending through the side wall of base B and through an opening in frame 25, forming a bearing therefor, is a shaft 46, having a beveled pinion 47 on its inner end meshing with bevel-gear 45 and on the outer end a hand-wheel 48.

The operation of the horizontal training mechanism is as follows: The circuit through one of the clutches is closed by the controller and a double-throw switch 50, situated on the controller, the switch being arranged to connect either one or the other of the two magnetic clutches in the circuit. When the motor K is started, worm 28 on the motor-shaft drives worm-wheel 29 and clutch 30, and if switch 50 is thrown to the position in which coil 32 is connected in circuit clutch 30 is energized, armature 34 attracted, and pinion 33 turns with worm-wheel 29, driving gear-wheel 35 and shaft 27, thus training the projector in azimuth by means of pinion 3 on shaft 27 and gear-wheel 4 on the turn-table. When worm-wheel 29 is turning thus, it also drives pinion 36, gear-wheel 37, pinion 38, gear-wheel 39, collar 41, and clutch 40, the speed at which clutch 40 is turning being only a small fraction of the speed of worm-wheel 29 on account of the series of reductions. Should it be desired to rotate the projector horizontally at a very slow rate for searching, the switch 50 is thrown in the opposite direction, clutch 30 deënergized, and circuit closed through coil 52 of clutch 40. Armature 34 is then dropped, so that pinion 33 turns loosely on shaft 26 and armature 43 is attracted. The turning is then accomplished by worm 28 driving worm-wheel 29, pinion 36, gear-wheel 37, pinion 38, gear-wheel 39, collar 41, clutch 40, armature 43, pinion 42, gear-wheel 44, and shaft 27. In this case it is evident that the turning motion is accomplished very slowly on account of the speed reductions in the gearing. For training the projector horizontally by hand switch 50 is thrown to the "off" position, so that both clutches are deënergized. The hand-nut 48 is then turned, driving shaft 27 by shaft 46 and bevel-gears 47 and 45.

Current through the motor-armatures is regulated by a master-controller operating electromagnetically-actuated switches situated in the base of the projector and divided into two groups—M for the horizontal training and N for the vertical training. The master-controller is preferably provided with a handle which can be moved in any direction, movement horizontally completing the circuit through the coils of the switches for the horizontal training and movement vertically completing the circuit through the coils of the switches for the vertical training. Each group consists of three switches—one for closing circuit through the motor-armature in one direction through a resistance, one for closing circuit through the motor-armature in the opposite direction through a resistance, and one for short-circuiting the resistance in either case. The two first-mentioned switches are provided with auxiliary contacts, so arranged that when the switches are open the armatures are short-circuited. The three switches in each group are mounted on a base 83 of insulating material and suspended from platform L of the base by angle-irons 84. Each switch consists of a solenoid 58, mounted in a frame 60 and having fixed core 59 and movable core 61. The movable core 61 is pivoted at its lower end to the contact-carrier 62, which is pivoted at one end to an extension of frame 60 and is normally retracted by spring 67. The switches for closing circuit through the motor-armatures $2^a$ and $4^a$ of Fig. 6 have an insulating-block 63, mounted on the movable end of the contact-carrier 62, to which are secured near one end contact-finger 64 and spring-metal connection 69 to stud 81 on base 83 and near the other end contact-fingers 65 and 66 and a similar spring-metal connection to a stud 82 on base 83. When the movable core 61 is drawn into the solenoid, carrier 62 is drawn up against the tension of spring 67 and contact is made between finger 64 and strip or stud 70 and between finger 65 and stud 71. When the circuit through the solenoid is broken, carrier 62 is drawn back by spring 67, those contacts broken, and contact made between finger 66 and stud 68, mounted on an extension of frame 60. The switch for short-circuiting the resistance in the motor-armature circuit $3^a$ of Fig. 6 has a strip of conducting material 72, fastened to the end of the carrier 62, instead of an insulating-block, to which are secured fingers 73 and 74, arranged to make contacts, when the carrier is drawn up, with studs 75 and 76. A resistance R and R', one of which is shown in section in Fig. 2, is connected between the studs of each short-circuiting switch. It consists of resistance-wire, wound on a hollow porcelain drum which is suspended from platform L of the base.

Secured to webs depending from the under side of the turn-table C is a platform 77, carrying on its under side a covering of insulating material 78, secured to which are five collector-rings 79. (Shown in dotted lines in Fig. 1 and in section in Fig. 2.) In the platform L of the base are mounted brushes 80, (also shown in Fig. 1,) bearing on the collector-rings 79. Two of the collector-rings carry the current for the projector-lamp; and to insure good electrical connection I prefer to use two brushes for each of these rings on account of the heavy current they carry. Two other collector-rings and brushes carry the current for the armature of motor H. The fifth collector-ring and its brush carry the current for the field of motor H, from which it returns over the lamp-return.

The connections between the various parts are shown diagramatically in Fig. 8, in which P and S represent the two plates of the controller, which are preferably shifted, the one horizontally and the other vertically, by a single handle. J represents the generator, from which current is led to the projector-lamp T through rheostat $r$ and cable $1^c$, returning over cable $2^c$. From the positive side of the generator wire $3^c$ is run to the switches in the base of the projector. From junction-point $d$ in wire $3^c$ and within the projector-base wire $a$ leads to plates P and S of the controller, and from junction-points $e$ and $e'$ wires $e$ and $e'$ supply the fields of motors H and K, respectively. When the controller-handle is moved either to the right or left, contact is first made between plate P and stud $5^a$. Current then flows from the generator along wire $3^c$ to $d$, wire $a$, wire $1^a$, stud $1^a$, plate P, stud $5^a$ to switch 50, then along either wire $5^a$ or $5^{a\prime}$ to clutch 40 or 30, depending on which way switch 50 is thrown, returning over cable $2^c$. The clutch energized attracts its armature, and either the usual horizontal-training mechanism or the slow-searching mechanism is ready to be operated by the motor, as above described. A further movement of the controller-handle to the right shifts plate P until contact is made with stud $2^a$. The circuit is then completed from the generator over wire $3^c$ to $d$, wires $a$ and $1^a$, stud $1^a$, plate P, stud $2^a$, wire $2^a$, and solenoid $2^a$, returning over wire $4^c$ and cable $2^c$. Solenoid $2^a$ attracts its core, drawing up the contact-carrier 62, making contact at studs 70 and 71 and breaking contact at stud 68. Current then flows along wire $3^c$ through resistance R to stud 70, spring-metal connection 69 to stud 81, and through the armature of motor K, returning to studs 82 and 71 and over wire $4^c$ and cable $2^c$. The motor is thus caused to revolve, but not at its full speed on account of resistance R in series with the armature. A further movement of the controller-handle to the right makes contact between plate P and stud $3^a$, completing the circuit through solenoid $3^a$, which attracts its core, thereby short-circuiting resistance R. The current is then strengthened through the armature of the motor, and it drives at an increased speed, training the projector, as before described. When the controller-handle is turned to the left, contact is first made at stud $5^a$, and one of the clutches 40 or 30, depending on the way switch 50 is thrown, is energized, as before. Contact is next made between plate P and stud $4^a$, completing the circuit through solenoid $4^a$, which attracts its core. The current then flows along wire $3^c$ through resistance R to stud $81'$, through the spring-metal connection to stud $70'$, and then through the armature of motor K, returning to studs $82'$ and $71'$ and to the generator over wire $4^c$ and cable $2^c$. It will be noted that the current thus flows through the motor-armature in a direction opposite to that when solenoid $2^a$ was energized, and as the current in the field remains the same the motor drives and the projector is turned in the opposite direction. A further movement of the controller-handle to the left makes contact between plate P and stud $3^a$, energizing solenoid $3^a$ and short-circuiting resistance R, as before, allowing the motor to run at full speed in that direction. When the controller-handle is thrown to the "off" position, as shown diagrammatically in Fig. 8, springs 67 retract the contact-carriers 62, making contact at 68 and $68'$ and short-circuiting the motor-armatures, as a complete circuit is made from stud 68 through the spring-metal connection to stud 82, through the motor-armature to stud $82'$, stud $68'$, and back to stud 68. The motor can thus be stopped immediately when the projector is in the desired position.

The connections between plate S, switches $2^b$, $4^b$, and $3^b$, and the motor H are the same as those described applying to motor K, except that there are no electromagnetically-actuated clutches for bringing into operation a reducing-gear for varying the speed of the turning motion, the only speed variation being made by cutting resistance $R'$ into or out of the armature-circuit.

It will be understood that the controller-handle can be shifted diagonally, making the desired connections through both motors and training the projector both in altitude and azimuth simultaneously.

What I claim as new, and desire to secure by Letters Patent of the United States, is—

1. In a projector, a stationary base, a turn-table mounted to rotate on the stationary base, said turn-table carrying the projector-drum, a motor suspended from the under side of the turn-table, and means actuated by the motor for training the projector in altitude.

2. In a projector, a base, a turn-table movably mounted thereon and carrying the projector-drum, a motor suspended from the under side of the turn-table, means operated by the motor for training the projector in altitude, a motor secured to the base, and gearing between said motor and the turn-table operated by the motor for training the projector in azimuth.

3. In a projector, a base, a turn-table movably mounted thereon and carrying the projector-drum, a motor suspended from the under side of the turn-table, means actuated by the motor for training the projector in altitude, a motor secured to the base, a gear-wheel secured to the under side of the turn-table, and gearing meshing with said gear-wheel and driven by the motor for training the projector in azimuth.

4. In a projector, a base, a turn-table mounted thereon and consisting of two parts fastened together but adapted to be detached when desired, a motor and means for training the projector secured to one part, and means for supporting the projector-drum secured to the other part.

5. In a projector, the combination of a base, motors for training the projector in altitude and azimuth, and electromagnetically-actuated switches within the base for controlling the motors.

6. In a projector, a motor, gearing by which the motor trains the projector, and electromagnetically-actuated switches for regulating the supply of current to the motor, in combination with a master-controller for operating the switches.

7. In a projector, a motor, two electromagnetic clutches, gearing operated by the motor for training the projector when one clutch is energized, gearing operated by the motor for training the projector at a different rate when the other clutch is energized, and electromagnetically-actuated switches for regulating the supply of current to the motor, in combination with a master-controller for closing and opening circuit through the coils of the switches and clutches.

8. In a projector, the combination of a base, motors for training the projector in altitude and azimuth, and electromagnetically-actuated switches for closing and opening the circuit through the motor-armatures.

9. In a projector, the combination of a base, motors situated therein, and electromagnetically-actuated switches within the base for closing the circuit through the armatures of the motors in either direction.

10. In a projector, the combination of a base, motors situated within the base, and electromagnetically-actuated switches for closing and opening the circuit through the motor-armatures, said switches being provided with auxiliary contacts for short-circuiting the armatures of the motors when the switches are open.

11. In a projector, the combination of a base, motors situated therein, a resistance for each motor, and electromagnetically-actuated switches for closing circuit in either direction through each motor-armature through a resistance and a switch for short-circuiting the resistance.

12. In a projector, a base, a motor situated within the base, two clutches, gearing operated by the motor when one of the clutches is closed for training the projector, and gearing operated by the motor when the other clutch is closed for operating the training mechanism at a different speed.

13. In a projector, a base, a turn-table movably mounted thereon and carrying the projector-drum, a motor, means operated by the motor for training the projector in azimuth, and means for introducing speed-reducing gear into the training mechanism for accomplishing the training at a slower rate.

14. In a projector, a base, a motor situated within the base, two electromagnetic clutches operated from a distant point, gearing operated by the motor when one of the clutches is closed for training the projector, and gearing operated by the motor when the other clutch is closed for operating the training mechanism at a different speed.

15. In a projector, a base, a turn-table movably mounted thereon and carrying the projector-drum, a motor, two clutches, gearing for training the projector operated by the motor when one of the clutches is closed and means for operating said gearing by hand from outside the base and turn-table when the other clutch is closed.

16. In a projector, a base, a turn-table movably mounted thereon and carrying the projector-drum, a motor, two clutches, a hand-nut operating the two clutches simultaneously, and gearing for training the projector operated by the motor when one of the clutches is closed and operated by hand from outside the turn-table and base when the other clutch is closed.

17. In a projector, a motor, means operated thereby for training the projector, a resistance for varying the rate of training, and means auxiliary to the resistance operated from outside the projector for effecting a further variation of the rate of training.

18. In a projector, a motor, means operated thereby for training the projector in azimuth at two different speeds, one of which bears a small fractional relation to the other whereby the horizon may be swept quickly or searched slowly by the beam of light.

In witness whereof I have hereunto set my hand this 19th day of February, 1903.

JOHN L. HALL.

Witnesses:
 BENJAMIN B. HULL,
 HELEN ORFORD.